(12) United States Patent
Ben-Yaacov et al.

(10) Patent No.: US 11,973,367 B1
(45) Date of Patent: Apr. 30, 2024

(54) CONTROL CIRCUIT FOR LINEARLY CHARGING POWER CAPACITORS

(71) Applicant: IRP NEXUS GROUP LTD., Nes-Ziona (IL)

(72) Inventors: Shmuel Ben-Yaacov, Tel Itzhak (IL); Yivgeni Semidotskih, Ofakim (IL); Paul Price, Nes-Ziona (IL)

(73) Assignee: IRP Nexus Group Ltd., Nes-Ziona (IL)

( * ) Notice: Subject to any disclaimer, the term of this patent is extended or adjusted under 35 U.S.C. 154(b) by 0 days.

(21) Appl. No.: 18/050,296

(22) Filed: Oct. 27, 2022

(51) Int. Cl.
*H02J 7/34* (2006.01)
*H02J 7/00* (2006.01)

(52) U.S. Cl.
CPC ........ *H02J 7/345* (2013.01); *H02J 7/007182* (2020.01); *H02J 2207/50* (2020.01)

(58) Field of Classification Search
CPC ...................................... H02J 7/345
USPC ............................................. 320/166
See application file for complete search history.

(56) References Cited

U.S. PATENT DOCUMENTS

| | | | | |
|---|---|---|---|---|
| 2008/0100382 | A1* | 5/2008 | Fisher | H03F 3/245 330/288 |
| 2016/0373063 | A1* | 12/2016 | Khandavalli | H03F 3/193 |
| 2020/0358307 | A1* | 11/2020 | Moon | H02H 9/026 |
| 2021/0080987 | A1* | 3/2021 | Rodriguez | H02M 3/157 |

* cited by examiner

*Primary Examiner* — Yalkew Fantu
(74) *Attorney, Agent, or Firm* — Fenwick & West LLP; Daniel Brownstone (57) ABSTRACT

A circuit for effectively controlling the process of pre-charging a power capacitor, comprising an integrator circuit consisting of an operational amplifier implementing a voltage dependent current source, the power capacitor is being connected between the output of the integrator and ground; a high side driver connected to the positive input of the integrator via a serial current limiting resistor, for generating control signals provided to the dependent current source, the negative terminal of the driver being connected to the negative input of the integrator; a control capacitor connected between the positive input of the operational amplifier and ground. Upon activating the driver by an activation pulse, the power capacitor is being charged in a constant current determined by the current limiting resistor, until reaching a desired voltage, while the voltage across the power capacitor follows the volage across the control capacitor.

16 Claims, 7 Drawing Sheets

CONTROL CIRCUIT FOR LINEARLY CHARGING POWER CAPACITORS

Field of the Invention

The present invention relates to the field of power capacitors. More particularly, the present invention relates to a system and method for effectively controlling the process of charging power capacitors.

BACKGROUND OF THE INVENTION

Power capacitors are widely used in many applications. For example, a charged power capacitor can be used for generating power pulses for powering loads such as laser generators. Another example is using power capacitors for trapping ripple currents that flow in inputs of inverters and converters, so as to prevent them to flow back into the source and to stabilize the voltage at the input.

Power capacitors cannot be charged by direct connection to a power supply, since such a direct connection may generate a very high current pulse that can damage them, and may cause unwanted oscillations due to stray inductances and may pose a safety issue.

Figure 1:
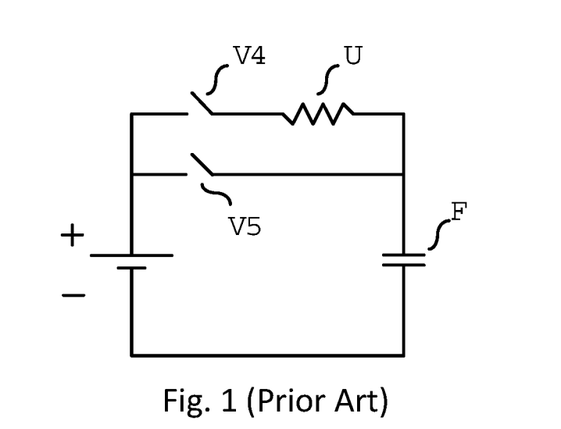
FIG. 1 (prior art) schematically illustrates a simplified model of conventional pre-charging circuit.

In order to prevent the above problems, the power capacitor is preferably first pre-charged, and only then is used for powering the load. Such a pre-charging circuit is illustrated in FIG. 1 (prior art). In this example, at the first stage only switch 51 is conducting and therefore, the power capacitor C is charged via resistor R in a current that is controlled by the resistance of R. At the end of the charging process the voltage across the capacitor is equal to the voltage of the power source, switch S2 is turned on and switch 1 is turned off (nonconducting) and as a result the power capacitor C is ready for powering. However, this pre-charging circuit is costly and relatively complicated since it requires two switches, two command signals and a power resistor. Also, during pulsed powering, this conventional circuit suffers from a relatively high peak current.

It is therefore an object of the present invention to provide a system and method for effectively controlling the process of charging power capacitors, which requires only a single switch and one control signal.

It is therefore an object of the present invention to provide a system and method for effectively controlling the process of charging power capacitors, with reduced peak current during pulsed powering mode.

Other objects and advantages of the invention will become apparent as the description proceeds.

SUMMARY OF THE INVENTION

A method for effectively controlling the process of pre-charging a power capacitor, comprising:
  a) providing an integrator circuit consisting of an operational amplifier implementing a voltage dependent current source;
  b) connecting the power capacitor between the output of the integrator and ground;
  c) providing a high side driver connected to the positive input of the integrator via a serial current limiting resistor, for generating control signals provided to the dependent current source, the negative terminal of the driver being connected to the negative input of the integrator;
  d) connecting a control capacitor between the positive input of the operational amplifier and ground; and
  e) upon activating the driver by an activation pulse, charging the power capacitor in a constant current determined by the current limiting resistor, until reaching a desired voltage, while the voltage across the power capacitor follows the voltage across the control capacitor.

A circuit for effectively controlling the process of pre-charging a power capacitor, comprising:
  a) an integrator circuit consisting of an operational amplifier implementing a voltage dependent current source, the power capacitor is being connected between the output of the integrator and ground;
  b) a high side driver connected to the positive input of the integrator via a serial current limiting resistor, for generating control signals provided to the dependent current source, the negative terminal of the driver being connected to the negative input of the integrator;
  c) a control capacitor connected between the positive input of the operational amplifier and ground; and
  wherein upon activating the driver by an activation pulse, the power capacitor is being charged in a constant current determined by the current limiting resistor, until reaching a desired voltage, while the voltage across the power capacitor follows the voltage across the control capacitor.

The charging current of the power capacitor may be adjusted by the current limiting resistor and the control capacitor.

The integrator circuit may be implemented by one or more parallelly connected MOSFETs.

The power capacitor may consist of parallelly connected bus capacitors.

A filtering resistor may be connected in series with the positive input of the integrator circuit, for reducing unwanted ripple during powering a load from the pre-charged capacitor.

A diode may be connected in parallel with the current limiting resistor, for allowing the pre-charged capacitor to discharge and reach a turn-off state.

The pre-charged power capacitor may be a non-linear capacitor, such as a voltage dependent ceramic capacitor.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PRESENT INVENTION

The present invention proposes a system and method for effectively controlling the process of charging power capacitors using a novel integrator circuit.

Figure 2:
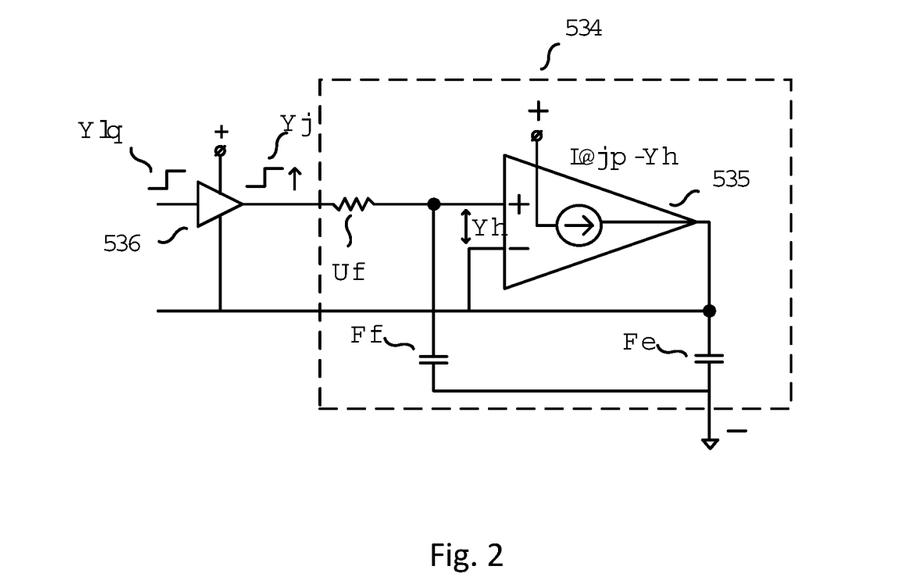
FIG. 2 schematically illustrates the implementation model of the novel integrator circuit, according to an embodiment of the invention.

FIG. 2 schematically illustrates the principle of operation of the implementation of the novel integrator circuit 201, according to an embodiment of the invention. Integrator 201 is implemented by a voltage dependent current source (transconductance amplifier) 202 with a high gain $g_m$ ($g_m \gg 1$) and high input impedance, such that the voltage $V_e$ across its inputs is essentially zero ($V_E \to 0$) for a finite output current. The current of the operational transconductance amplifier 202 is defined by $I = g_m \cdot V_E$, where Ve is the input voltage and gm is the gain. A large power capacitor Cb (representing the capacitor to be charged) is connected between output of the and ground and a small, control capacitor Cc is connected between the positive input of the operational amplifier 202 and ground, thereby forming a kind of voltage follower between the positive input voltage terminal of the amplifier and the high side terminal of Cb. In this configuration, the drive (control) signal is floating and referred to the operational amplifier 202. Alternatively, a dependent current source may be used, rather than using a current source.

An activation input voltage Vin is provided to the operational amplifier 202 via a high side driver 203 for generating control signals provided to the dependent current source (that can drive the gate of a MOSFET higher than the drain voltage), the output of high side (HS) gate driver 203 is connected to the positive input of the operational amplifier 202, via a current limiting resistor Rc. The resulting voltage at the output of the auxiliary amplifier 203 is Vg, which acts as a source for charging the control capacitor Cc via Rc. Since Ve→0, a constant current Irc=Vg/Rc=Ic_c will flow via Rc, and since the input resistance of the amplifier is high, the current will flow into the control capacitor Cc and will charge it, so the voltage Vcc will rise linearly. Due to the high gain gm, any increase in the voltage across Cb will increase the output current of the amplifier to maintain Ve→0 (otherwise the current will keep increasing until Ve→0). If Ve→0 is maintained then the voltage across Cb will follow the volage across Cc. Since the voltage of Cc increase linearly, the voltage of Cb will also increase linearly. Hence, since ($V_E \to 0$), Vcc~Vcb=(Vg/Rc)·t (where t is the charging time), so the voltage of Cb will also increase linearly. Since I=C dv/dt The ratio between the charging currents will be the ratio between the capacitances, such that:Icb/Icc=Cb/Cc. This implies that the charging current of Cb can be adjusted by choosing an appropriate Rc and Cc.

Figure 3:
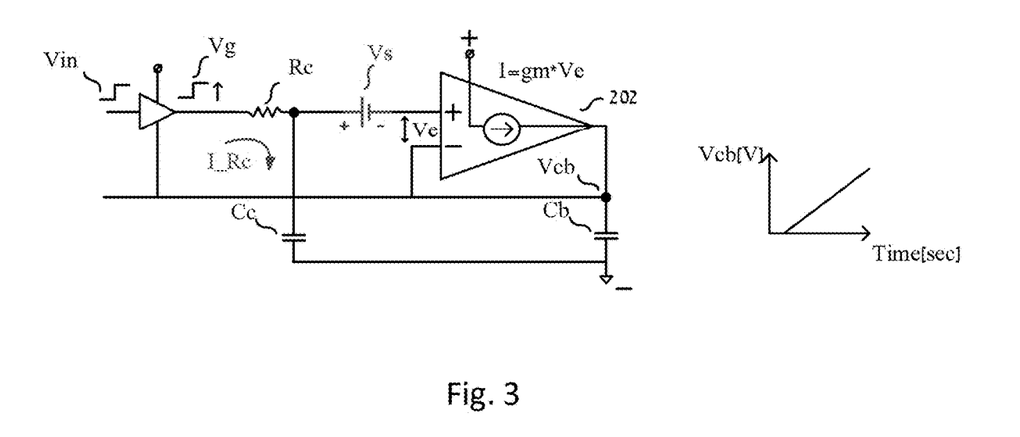
FIG. 3 schematically illustrates the implementation of FIG. 2, with the presence of an offset voltage, according to an embodiment of the invention.

FIG. 3 schematically illustrates the implementation of FIG. 2 with the presence of an offset voltage Vs, according to an embodiment of the invention. This offset voltage across the inputs of operational amplifier 202. This offset will exist also between the voltages Vcc and Vcb, so practically, the charging current of the control capacitor Cc will be will be Irc=(Vg−Vs)/Rc and the voltage Vcb will rise linearly according to Vcb=(Vg−Vs/Rc)·t.

Figure 4:
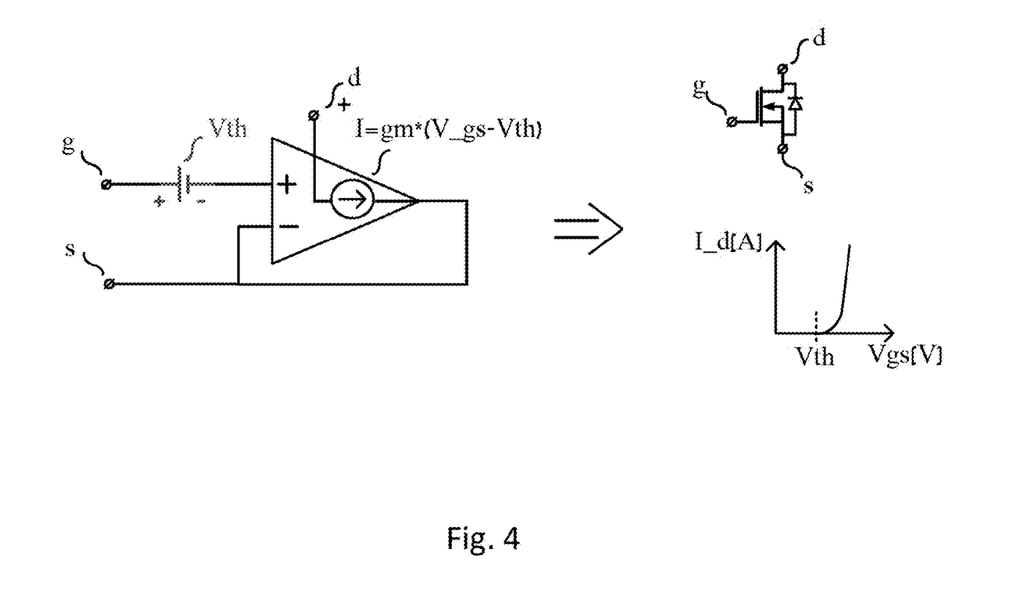
FIG. 4 schematically illustrates a possible implementation of the integrator using a MOSFET.

FIG. 4 schematically illustrates a the use of a MOSFET in lieu of a transconductance amplifier. A typical MOSFET has a high current gain gm (typically of about 200 and above) and starts conducting only above threshold voltage Vth, which represents the offset voltage. Hence the MOSFET implementation of FIG. 4 is according to the integrator model of FIG. 3.

Figure 5A:
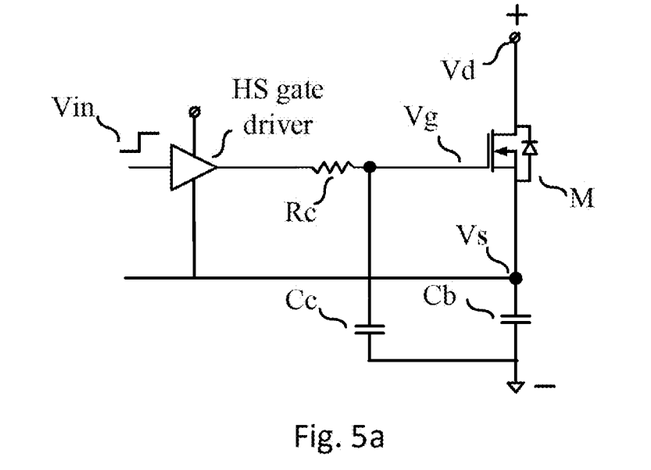
FIG. 5a schematically illustrates a possible implementation of the system provided by the present invention, using a MOSFET.

FIG. 5a schematically illustrates a possible implementation of the system provided by the present invention, using a power MOSFETs which acts both as a pre charger and as the main switch. Pre-charging will start by an activation pulse provided to an HS gate driver, and as a result, control capacitor Cc will be charged by a constant current that is determined by the resistor Rc. The voltage of to power capacitor will follow the voltage of the control capacitor Cc which will rise linearly, until reaching the supply voltage V+, which cannot be exceeded. At this point, charging will be terminated and the MOSFET will remain in its conducting state, while allowing powering a load (an inverter, in this example). Therefore, there is no need for a second switch S2 (shown in FIG. 1), a second command signal and a power resistor as in the prior art solution (FIG. 1). Instead, the pre-charging process is obtained just by adding a resistor Rc and a control capacitor Cc. Since the control capacitor Cc can be chosen to be much smaller than Cb, the current via Rc an Cc will be accordingly smaller.

Figure 5B:
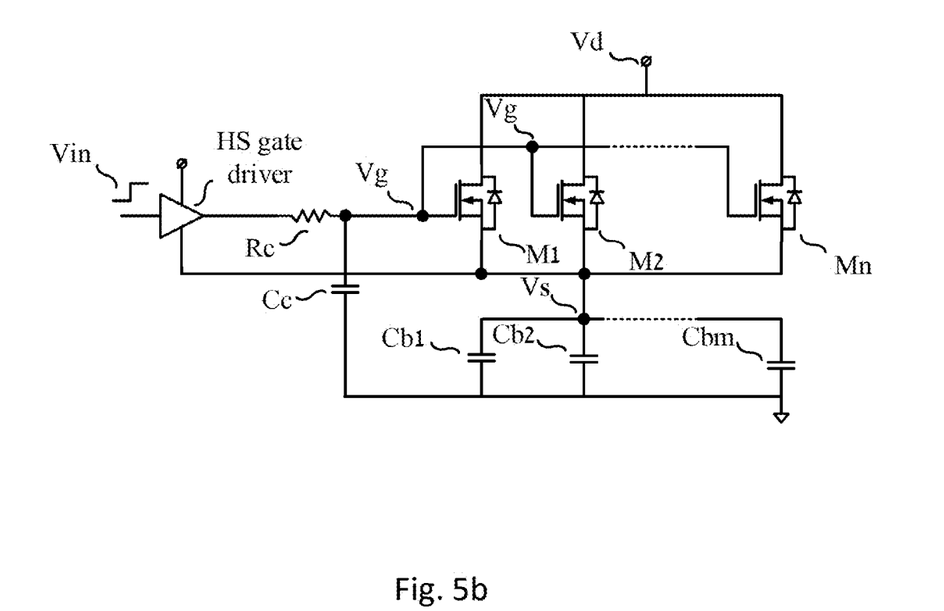
FIG. 5b schematically illustrates a possible implementation of the system provided by the present invention, using parallel connected MOSFETs for high current applications.

FIG. 5b schematically illustrates a possible implementation of the system provided by the present invention, using parallel connected power MOSFETs to increase the current capability of the power switch. The system consists of a plurality of parallelly connected MOSFETs M1, . . . ,Mm, charging one capacitor or a bank of capacitors (a set of parallelly connected capacitors $Cb_1, \ldots, Cb_m$), which are, for example, the bus capacitors at an input of an inverter. The parallelly connected capacitors (bus capacitor) will be charged by a constant current.

In many practical cases, there are differences between the threshold voltages of the MOSFETs, even if they are selected from the same manufacturing lot. Therefore, in the practical implementation of the parallel embodiment, the MOSFET with the lowest threshold voltage ($V_{th}$) will conduct first, and at the beginning, pre-charging of all capacitors will be via that MOSFET. After that, the voltage over the capacitors will start rising and more MOSFETs will start conducting as well (and participate in the pre-charging stage), until all of them will participate (since the voltage across them will rises linearly).

Figure 6:
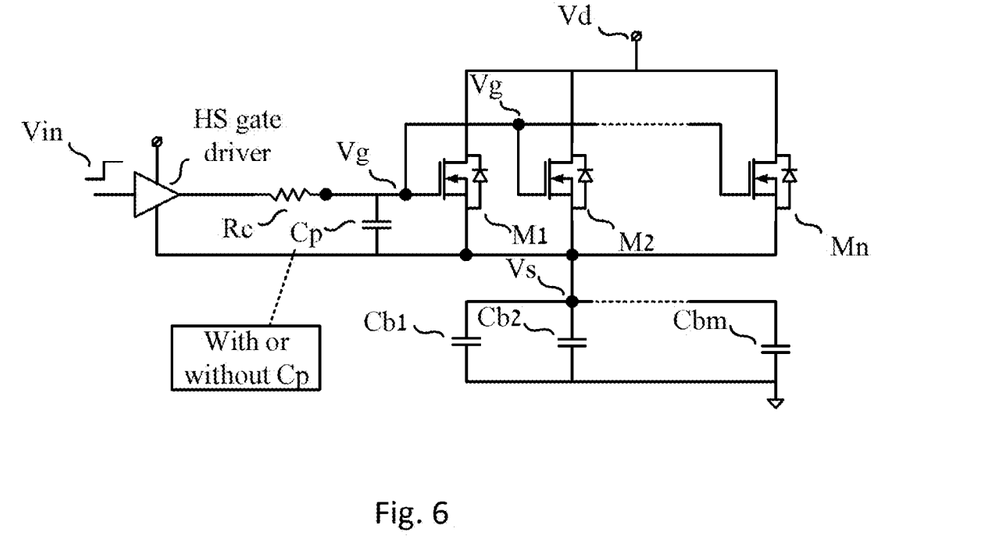
FIG. 6 shows an alternative implementation of the circuit of FIG. 5b, according prior art.
Figure 7:
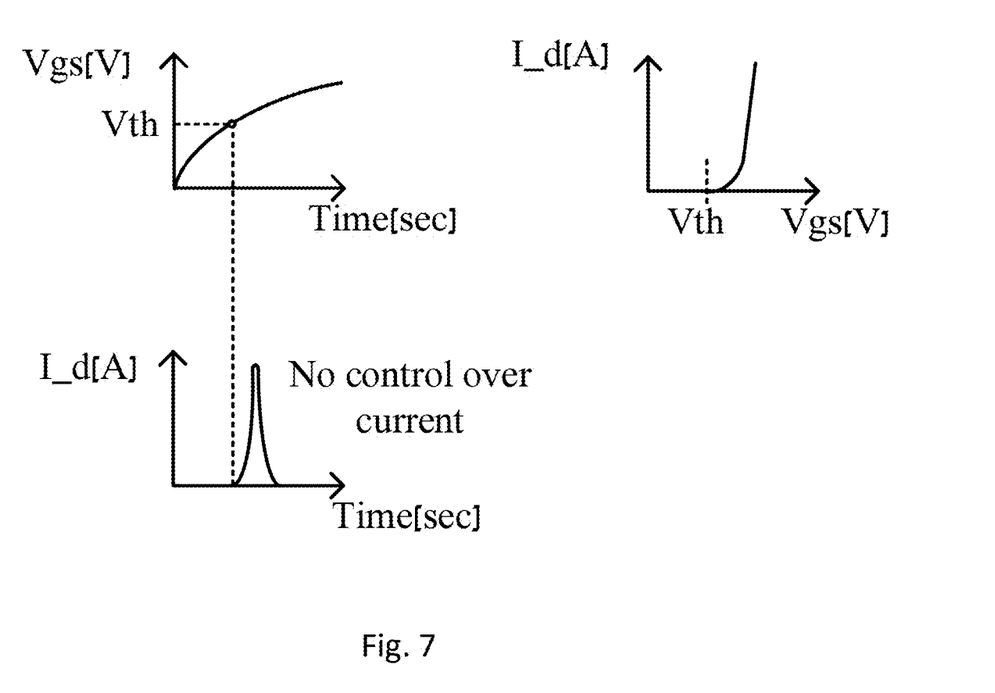
FIG. 7 shows the gate to source voltage Vgs changes of each MOSFET, in the prior art implementation of FIG. 6, until reaching the threshold Vth, without any control over the current.

FIG. 6 is provided to better differentiate the pre charger embodiment according to this invention and prior art implementation. In prior art, a capacitor Cp is connected between the gate and source of the MOSFET. Alternatively, Cp may be eliminated and Rc is chosen to be large. The objective is to slow down the rate Vgs rise and by that, to lower the peak charging current. However, as shown in FIG. 7, the gate to source voltage Vgs of each MOSFET will rise until reaching the threshold Vth, and then due to the high gm of the MOSFET, the current will jump to a high value without any control.

A known problem of this prior art method is the safe operating area (SOA—the maximum value of $V_{DS}$, $I_D$ and time envelope of operation which guarantees safe operation when the MOSFET work in forward bias). Even though at the beginning of pre-charging the current through each MOSFET may be relatively low, the voltage over the bus capacitors is small, so each MOSFET is subject to a relatively high voltage. This voltage may exceed the SOA and cause breakdown. On the other hand, in the implementation proposed by the present invention the (constant) current during pre charge can be adjusted by Cc and Rc, such that the limits of the SOA are not exceeded.

Figure 8:
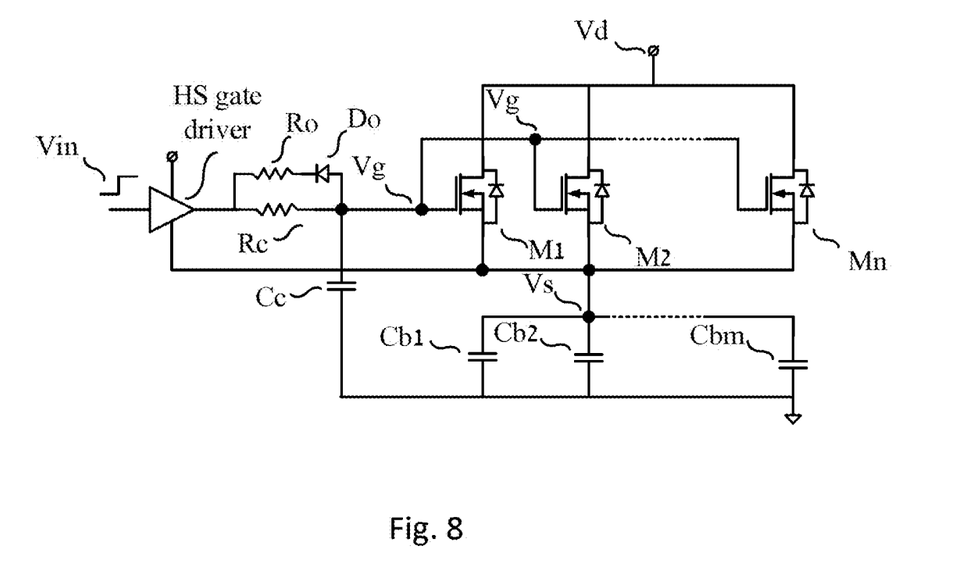
FIG. 8 shows using a bypassing path for discharging the capacitors, to obtain fast turn-off of the MOSFETs.

Some applications require fast turn-off of the MOSFETs. Such fast turn-off is limited, in the embodiment of FIG. 5a,b since upon terminating the activation pulse, the charged capacitors will be discharged via resistor Rc, which is large, so this may take long time. In this case, faster turn-off may be achieved by adding a diode Do serially connected to a small resistor Ro, in parallel to the resistor Rc, as shown in FIG. 8. Hence, the capacitors can be discharged via a bypassing path of Do and Ro and allow the pre-charged capacitor to reach a turn-off state.

Figure 9:
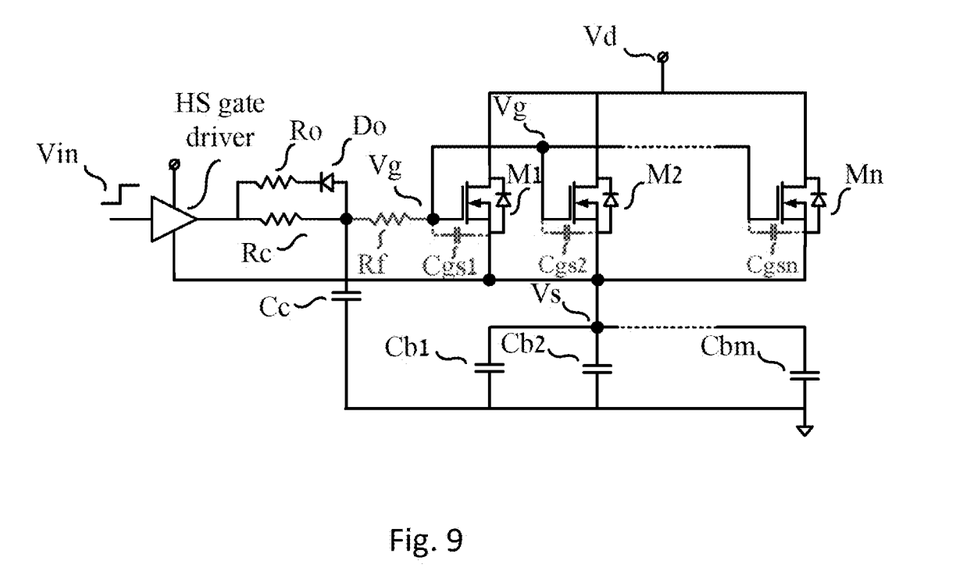
FIG. 9 illustrates adding a filtering resistor, for removing the ripple voltage from Vgs.

When the system connected to Cb, operates in pulses, such as an inverter, there will be a ripple over Cb which will result in an unwanted ripple over Vgs of each MOSFET. If the ripple will be relatively large, it can push the MOSFET into a non-conducting state. This problem is overcome by an embodiment of this invention that entails adding a filtering resistor Rf, as shown in FIG. 9. In this case, the ripple voltage will be removed from Vgs and applied to the resistor Rf, which in combination with the gate-source capacitance Cgs, functions as a filter.

According to another embodiment, in order not to exceed the temperature limits of the MOSFETs, the current that flows via each MOSFET is limited in order not to exceed the maximum temperature ratings and eliminate overheating.

According to another embodiment, the capacitor Cc is a capacitor that is voltage dependent, such that at low voltages the capacitance is large and is decreased when the voltage across it increases. Commercial class II ceramic capacitors (e.g. a ceramic capacitors of X7R material) comply with this type of voltage dependency. Therefore, at the beginning of pre-charging, the voltage across Cc is low and as a result the capacitance of Cc is high and the voltage across each MOSFET is high. On the other hand, the current is limited by the high capacitance. As pre-charging proceeds, the voltage across Cc rises and as a result the capacitance of Cc becomes lower and the voltage across each MOSFET becomes lower. On the other hand, the current is increases due to lower Cc. Hence, in both states, the power dissipation of each MOSFET and the SOA are not exceeded.

Figure 10:
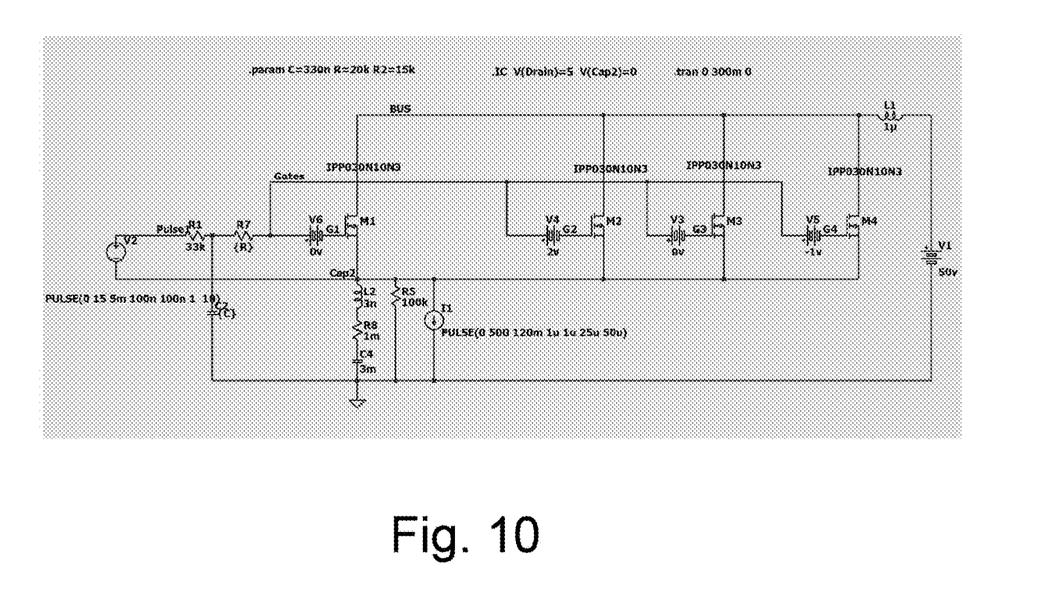
FIG. 10 illustrates a circuit simulation of the system provided by the present invention, using MOSFETs.
Figure 11:
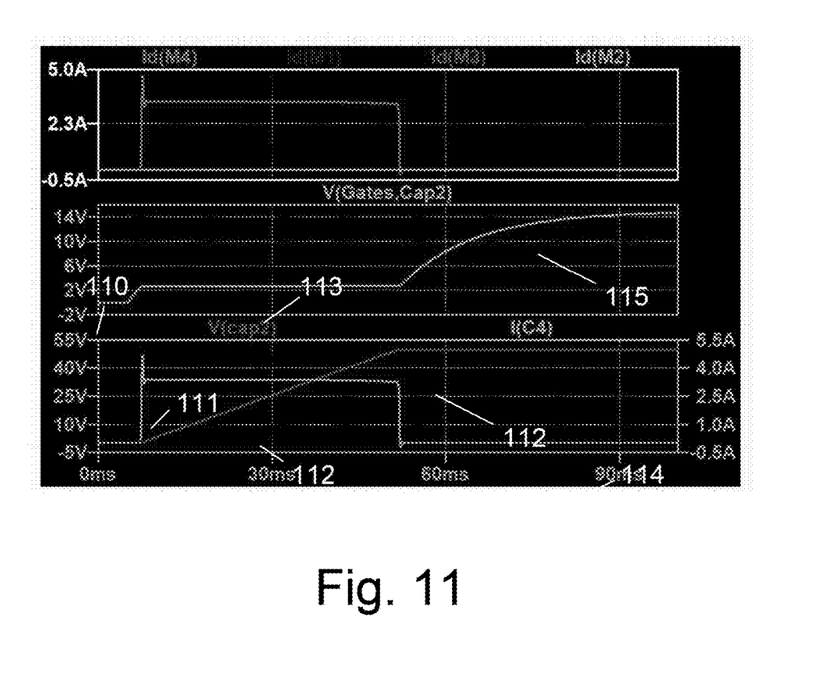
FIG. 11 shows the simulation results during the pre-charging stage.

FIG. 10 illustrates a circuit simulation of the system provided by the present invention, using MOSFETs. The circuit consists of four MOSFETs M1-M4, a charging resistor R1, the current control is C2 and the sum of all bus capacitors is represented by C4 (with parasitic inductance L2 and resistance R8. The filtering resistor is R7. Each gate of the MOSFETs has a series voltage source of a different value to represent a different threshold. In this example, threshold voltages of MOSFETs M1-M4 are V6=0v, V4=+2v, V3=0v and V5=−1v, respectively. Current source I1 represents the converter (the load) which consumes current pulses. The simulation results during the pre-charging stage are shown in FIG. 11.

After applying an input pulse 110, MOSFET M4 with the lowest threshold conducts first and its drain current IDM4 is about 3A. Current IC4 (about 3A as shown by graph segment 111) flows into C4 and the voltage V(cap2) across it rises linearly (graph segment 112). During this charging period, the gates voltage is constant (about 2.5 v, as shown by graph segment 113).

After the end of the end of the input pulse 110 (shown by graph segment 114), the voltage V(cap2) continues to rise (shown by graph segment 115) and all the remaining MOSFETs start conducting and also charge C4.

Figure 12:
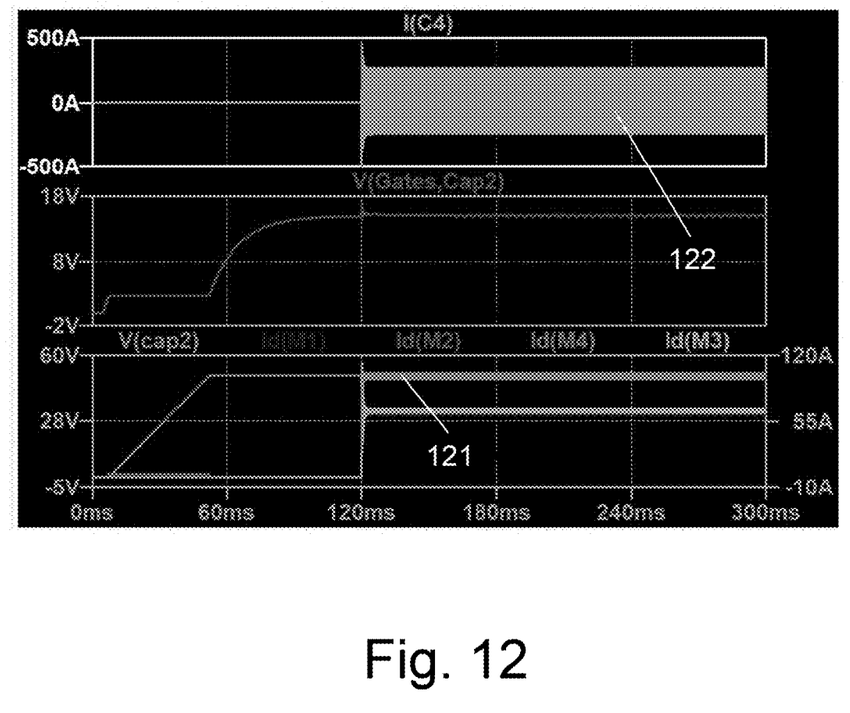
FIG. 12 shows a simulation of the waveforms during powering stage, when the pre-charged capacitor feeds the converter.

FIG. 12 shows a simulation of the waveforms during powering stage, when the pre-charged capacitor feeds the converter. Graph segment 121 shows the voltage V(cap2) across the capacitors bus with the associated ripple of about 3V. After pre-charging period of about 120 mS, all the MOSFETs conduct. At this period, the current IC4 consists of a series of pulses that range between −250 A and +250 A (shown by graph segment 122). Graph segment 123 shows that the ripple of voltage V(cap2) is low and does not affect the conductivity of the MOSFETs. The low ripple is obtained due to adding the filtering resistor R7.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:

1. A method for effectively controlling the process of pre-charging a power capacitor, comprising:
    a) providing an integrator circuit consisting of an operational amplifier implementing a voltage dependent current source;
    b) connecting said power capacitor between the output of the integrator and ground;
    c) connecting a control capacitor between the positive input of said operational amplifier and ground;
    d) providing a high side driver connected to the positive input of said integrator via a serial current limiting resistor Rc, for generating control signals provided to said dependent current source for establishing a constant current for charging said control capacitor, the negative terminal of said driver being connected to the negative input of said integrator; and
    e) upon activating said driver by an activation pulse, linearly charging said power capacitor in a constant current determined by said current limiting resistor Rc and being proportional to the ratio between the capacitance of said power capacitor and said control capacitor, until reaching a desired voltage, while said integrator circuit linearly charges said power capciator such that the voltage across said power capacitor follows the voltage across said control capacitor.

2. The method according to claim 1, wherein the charging current of the power capacitor is adjusted by the current limiting resistor and the control capacitor.

3. The method according to claim 1, wherein the integrator circuit is implemented by one or more parallelly connected MOSFETs.

4. The method according to claim 1, wherein the power capacitor consists of parallelly connected bus capacitors.

5. The method according to claim 1, further comprising connecting a filtering resistor in series with the positive input of said integrator circuit, for reducing unwanted ripple during powering a load from the pre-charged capacitor.

6. The method according to claim 1, further comprising connecting a diode in parallel with the current limiting resistor, for allowing the pre-charged capacitor to discharge and reach a turn-off state.

7. The method according to claim 1, wherein the pre-charged power capacitor is a non-linear capacitor.

8. The method according to claim 7, wherein the non-linear capacitor is a voltage dependent ceramic capacitor.

9. A circuit for effectively controlling the process of pre-charging a power capacitor, comprising:
   a) an integrator circuit consisting of an operational amplifier implementing a voltage dependent current source, said power capacitor is being connected between the output of the integrator and ground;
   b) a control capacitor connected between the positive input of said operational amplifier ground; and
   c) a high side driver connected to the positive input of said integrator via a serial current limiting resistor, for generating control signals provided to said dependent current source for establishing a constant current for charging said control capacitor, the negative terminal of said driver being connected to the negative input of said integrator;
   wherein upon activating said driver by an activation pulse, said power capacitor is being linearly charged in a constant current determined by said current limiting resistor Rc and being proportional to the ratio between the capacitance of said power capacitor and said control capacitor, until reaching a desired voltage, while said integrator circuit linearly charges said power capacitor such that the voltage across said power capacitor follows the voltage across said control capacitor.

10. The circuit according to claim 9, in which the charging current of the power capacitor is adjusted by the current limiting resistor and the control capacitor.

11. The circuit according to claim 9, in which the integrator circuit is implemented by one or more parallelly connected MOSFETs.

12. The circuit according to claim 9, in which the power capacitor consists of parallelly connected bus capacitors.

13. The circuit according to claim 9, further comprising a filtering resistor connected in series with the positive input of said integrator circuit, for reducing unwanted ripple during powering a load from the pre-charged capacitor.

14. The circuit according to claim 9, further comprising a diode connected in parallel with the current limiting resistor, for allowing the pre-charged capacitor to discharge and reach a turn-off state.

15. The circuit according to claim 9, in which the pre-charged power capacitor is a non-linear capacitor.

16. The circuit according to claim 15, in which the non-linear capacitor is a voltage dependent ceramic capacitor.

* * * * *

UNITED STATES PATENT AND TRADEMARK OFFICE
CERTIFICATE OF CORRECTION

PATENT NO. : 11,973,367 B1
APPLICATION NO. : 18/050296
DATED : April 30, 2024
INVENTOR(S) : Ben-Yaacov et al.

It is certified that error appears in the above-identified patent and that said Letters Patent is hereby corrected as shown below:

On the Title Page

Item (57), in Column 2, under "Abstract", Line 16, delete "volage" and insert -- voltage --, therefor.

In the Claims

In Column 6, in Claim 1, Line 53, delete "capciator" and insert -- capacitor --, therefor.

Signed and Sealed this
Eleventh Day of June, 2024

Katherine Kelly Vidal
*Director of the United States Patent and Trademark Office*